(12) United States Patent
Kurtz et al.

(10) Patent No.: US 11,120,193 B2
(45) Date of Patent: *Sep. 14, 2021

(54) ANALYSIS OF COUPLED NOISE FOR INTEGRATED CIRCUIT DESIGN

(71) Applicant: International Business Machines Corporation, Armonk, NY (US)

(72) Inventors: Steven J. Kurtz, Austin, TX (US); Mark A. Lavin, Katonah, NY (US); Ronald D. Rose, Essex Junction, VT (US); Richard W. Taggart, Poughkeepsie, NY (US); Vladimir Zolotov, Putnam Valley, NY (US)

(73) Assignee: International Business Machines Corporation, Armonk, NY (US)

( * ) Notice: Subject to any disclaimer, the term of this patent is extended or adjusted under 35 U.S.C. 154(b) by 48 days.

This patent is subject to a terminal disclaimer.

(21) Appl. No.: 16/517,990

(22) Filed: Jul. 22, 2019

(65) Prior Publication Data
US 2019/0347379 A1 Nov. 14, 2019

Related U.S. Application Data

(63) Continuation of application No. 14/944,552, filed on Nov. 18, 2015, now Pat. No. 10,394,999.

(51) Int. Cl.
*G06F 30/398* (2020.01)
*G06F 30/367* (2020.01)
(Continued)

(52) U.S. Cl.
CPC ........ *G06F 30/398* (2020.01); *G06F 30/3323* (2020.01); *G06F 30/367* (2020.01); *G06F 30/39* (2020.01); *G06F 2119/10* (2020.01)

(58) Field of Classification Search
CPC .................................................... G06F 30/398
(Continued)

(56) References Cited

U.S. PATENT DOCUMENTS 5,586,046 A   12/1996  Feldbaumer et al.
5,892,682 A    4/1999  Hasley et al.
(Continued)

FOREIGN PATENT DOCUMENTS

WO       2007012787 A2      2/2007

OTHER PUBLICATIONS

Shrivastava, Sachin; Parameswaran, Harindranath; "Statistical Crosstalk Noise Analysis Using First Order Parameterized Approach for Aggressor Grouping," 2008, IEEE (Year: 2008).*
(Continued)

*Primary Examiner* — Eric D Lee
(74) *Attorney, Agent, or Firm* — Nathan M. Rau (57) ABSTRACT

A computer-implemented method includes identifying a noise cluster, representing the noise cluster according to a variational model, projecting the variational model onto one or more corners to yield a projected noise cluster, and determining a computed noise for the projected noise cluster. Optionally, the noise cluster includes one or more noise cluster elements, and each of the noise cluster elements are expressed as one or more circuit element terms, according to a canonical form. Optionally, at least one of the corners is a bounding corner. For the bounding corner, the projected noise cluster is generated by maximizing the circuit element terms for those noise cluster elements that tend to increase noise, and by minimizing the circuit element terms for those noise cluster elements that tend to decrease noise, whereby noise is maximized for the canonical form. A corresponding computer program product and computer system are also disclosed.

19 Claims, 7 Drawing Sheets

(51) Int. Cl.
*G06F 30/3323* (2020.01)
*G06F 30/39* (2020.01)
*G06F 119/10* (2020.01)

(58) Field of Classification Search
USPC ......................................................... 716/115
See application file for complete search history.

(56) References Cited

U.S. PATENT DOCUMENTS

| | | | |
|---|---|---|---|
| 6,836,873 | B1 | 12/2004 | Tseng et al. |
| 6,941,258 | B2 | 9/2005 | Van Heijningen et al. |
| 7,127,384 | B2 | 10/2006 | Zolotov et al. |
| 7,567,891 | B1 | 7/2009 | Liu et al. |
| 7,650,580 | B2 | 1/2010 | Kucukcakar et al. |
| 7,739,640 | B2 | 6/2010 | Abbaspour et al. |
| 7,882,471 | B1 | 2/2011 | Kariat et al. |
| 8,056,035 | B2 | 11/2011 | Buck et al. |
| 8,074,189 | B2 | 12/2011 | McConaghy et al. |
| 8,180,621 | B2 | 5/2012 | Phillips |
| 8,219,952 | B2 | 7/2012 | Tehrani et al. |
| 8,271,256 | B2 | 9/2012 | Khalily et al. |
| 8,306,803 | B2 | 11/2012 | Clement |
| 8,423,341 | B2 | 4/2013 | Lu |
| 8,495,544 | B2 | 7/2013 | Celik et al. |
| 8,612,908 | B2 | 12/2013 | Cooper et al. |
| 8,631,362 | B1 | 1/2014 | Mehrotra et al. |
| 8,713,501 | B1 | 4/2014 | Le et al. |
| 9,189,584 | B2 | 11/2015 | Feldmann et al. |
| 2006/0112359 | A1 | 5/2006 | Becer et al. |
| 2007/0156367 | A1 | 7/2007 | Kucukcakar et al. |
| 2009/0319960 | A1 | 12/2009 | Lin |
| 2010/0218152 | A1* | 8/2010 | Tehrani ............... G06F 30/367 716/113 |
| 2013/0091480 | A1 | 4/2013 | Horlacher et al. |
| 2015/0046891 | A1 | 2/2015 | Feldmann et al. |
| 2017/0140090 | A1 | 5/2017 | Kurtz et al. |

OTHER PUBLICATIONS

Basavarajaiah, Sunil, "Circuit Extraction and Simulation in the presence of Random and Systematic Process Variations", A thesis submitted to the Graduate Faculty of North Carolina State University in partial fulfillment of the requirements for the Degree of Master of Science, Computer Engineering, Raleigh, North Carolina, 2008, 61 pages.

Shepard et al., "Harmony: Static Noise Analysis of Deep Submicron Digital Integrated Circuits", IEEE Transactions on Computer-Aided Design of Integrated Circuits and Systems, vol. 18, No. 8, Aug. 1999, pp. 1132-1150.

"Variation Analysis and Design for Custom ICS Across SOC", Gary Smith EDA Consulting in Electronic Design, 6 pages, © 2011 Gary Smith EDA.

"Variation-Aware Custom IC Design: Improving PVT and Statistical Maximum Yield at the Performance Edge", Solido Design Automation Inc., 111 North Market Street, Suite 300, San Jose, CA 95113, 6 pages, provided in Search Report dated Jul. 30, 2015, <http://www.solidodesign.com/files/variation_aware_custom_ic_design_pvt_corners_monte_carlo.pdf>.

"Capacitor Types", Wikipedia, "Standard capacitance values and tolerances", https://en.wikipedia.org/wiki/Capacitor_types (last accessed Jun. 30, 2017), pp. 1-47.

Kanj et al., "Noise Characterization of Static CMOS Gates", Proceedings of the 41th Design Automation Conference, DAC 2004, San Diego, CA, USA, Jun. 7-11, 2004, pp. 888-893, https://www.researchgate.net/publication/221058188_Noise_characterization_of_static_CMOS_gates.

"Nominal capacitance definition and meaning", Dictionary of Engineering, http://www.dictionaryofengineering.com/definition/nominal-capacitance.html (last accessed Jun. 30, 2017), 1 page.

"Nominal resistance definition and meaning", Dictionary of Engineering, http://www.dictionaryofengineering.com/definition/nominal-resistance.html (last accessed Jun. 29, 2017), 1 page.

"Parasitic Extraction", Wikipedia, https://en.wikipedia.org/wiki/Parasitic_extraction (last accessed Jun. 30, 2017), pp. 1-3.

Shrivastava et al., "Statistical Crosstalk Noise Analysis Using First Order Parameterized Approach for Aggressor Grouping," 9th International Symposium on Quality Electronic Design, 2008 IEEE, pp. 445-449.

Vrudhula et al., "Estimation of the Likelihood of Capacitive Coupling Noise," DAC 2002, pp. 653-658.

Shepherd et al., "Global Harmony: Coupled Noise Analysis for Full-Chip RC Interconnect Networks," 1997 IEEE, pp. 139-146.

Agarwal et al., "Statistical Modeling of Cross-Coupling Effects in VLSI Inteconnects," ASP-DAC 2005 IEEE, pp. 503-506.

IBM, "Method to Analyze Statistical Noise Data for Compact Model Generation," IP.com Prior Art Database Technical Disclosure, Oct. 21, 2009, 4 pages.

M. Erturk et al., "Statistical BSIM model for MOSFET 1/f noise," Electronics Letters, Oct. 27, 2005, vol. 41, No. 22, 2 pages.

J. Cook et al., "Statistical Method of Noise Estimation in a Synchronous System," IBM Technical Disclosure Bullestin, vol. 37, No. 068, Jun. 1994, pp. 185-193. (Year: 1994).

Y. Liu et al., "Model Order-Reduction of RC(L) Interconnect including Variational Analysis," 1999 ACM , 6 pages. (Year: 1999).

P. S. Zuchowski et al., "Process and Environmental Variation Impacts on ASIC Timing," 2004 IEEE, pp. 336-342. (Year: 2004).

K. Agarwal et al., "Variational Delay Metrics for Interconnect Timing Analysis," ACM/DAC 2004, pp. 381-384. (Year: 2004).

K. Agarwal et al., "Statistical Interconnect Metrics for Physical-Design Optimization," IEEE Trans. on Computer-Aided Design of Integrated Circuits and Systems, vol. 25, No. 7, Jul. 2006, pp. 1273-1288. (Year: 2006).

R. Chen et al., "Static Timing: Back to Our Roots," 2008 IEEE, pp. 310-315. (Year: 2008).

List of IBM Patents or Patent Applications Treated as Related, Signed Jul. 22, 2019, 2 pages.

* cited by examiner

ANALYSIS OF COUPLED NOISE FOR INTEGRATED CIRCUIT DESIGN

BACKGROUND

The present invention relates generally to the field of integrated circuit design, and more particularly to analyzing coupled noise for integrated circuit design.

Integrated circuit design and fabrication is a lengthy, complex, and costly process. One challenge that integrated circuit design engineers face is predicting whether a given circuit will suffer an unacceptable degree of coupled noise under various process corners and operating conditions. Advances in analysis of coupled noise before fabrication continue to enhance the speed and reduce the cost of integrated circuit design.

SUMMARY

A computer-implemented method includes identifying a noise cluster, representing the noise cluster according to a variational model, projecting the variational model onto one or more corners to yield a projected noise cluster, and determining a computed noise for the projected noise cluster. A corresponding computer program product and computer system are also disclosed.

Optionally, the noise cluster includes one or more noise cluster elements, and each of the noise cluster elements are expressed as one or more circuit element terms, according to a canonical form.

Optionally, at least one of the corners is a bounding corner. For the bounding corner, the projected noise cluster is generated by maximizing the circuit element terms for those noise cluster elements that tend to increase noise, and by minimizing the circuit element terms for those noise cluster elements that tend to decrease noise, whereby noise is maximized for the canonical form.

DETAILED DESCRIPTION

Figure 1:
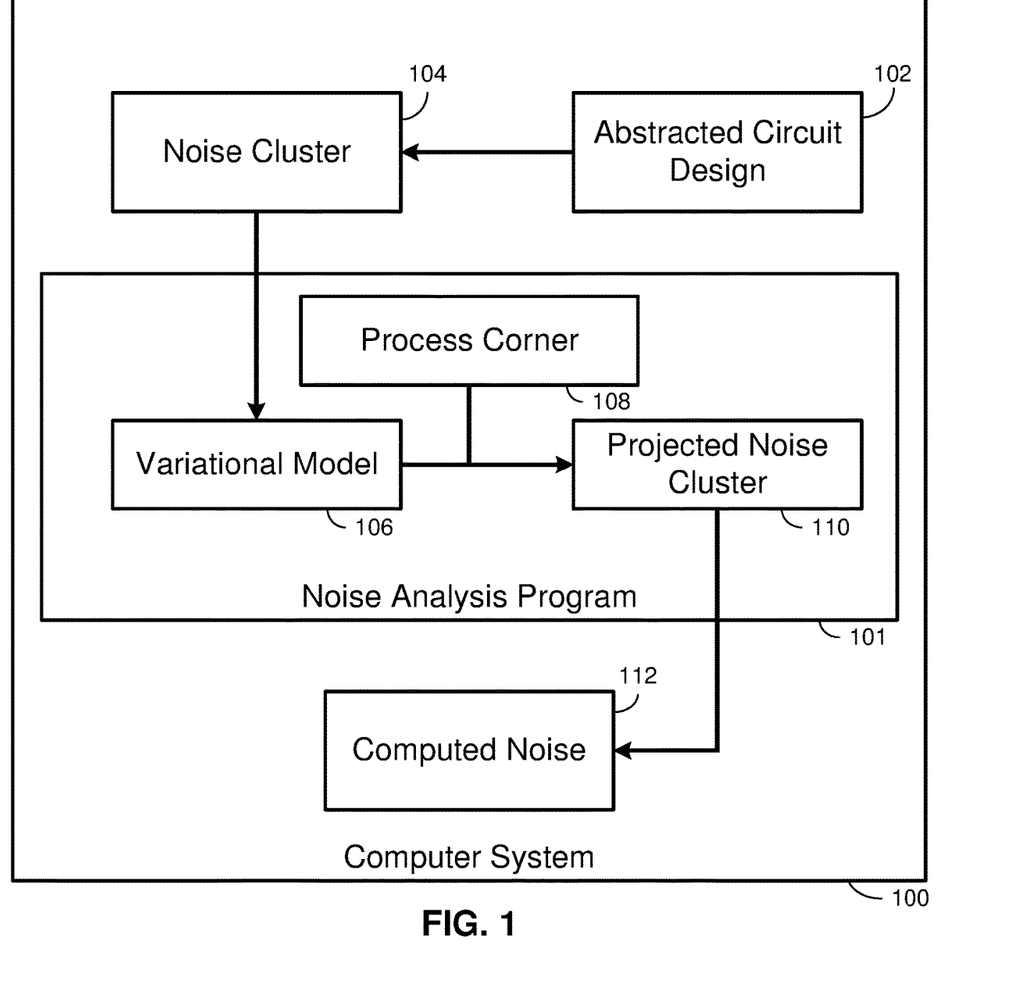
FIG. 1 is a data flow diagram illustrating a noise analysis program and its associated computer system environment, in accordance with at least one embodiment of the present invention.

FIG. 1 is a data flow diagram illustrating a noise analysis program 101 and its associated computer system environment, generally designated the computer system 100, in accordance with at least one embodiment of the present invention. Broadly, an abstracted circuit design 102 is divided into noise clusters 104. Each noise cluster includes a grouping of related circuit elements that, together, create a source of crosstalk or capacitively coupled noise. The methods described herein may consider a single noise cluster 104, and may be understood to reach the entire abstracted circuit design 102 by considering all noise clusters 104, serially or in parallel.

The abstracted circuit design 102 may include a transistor level design and wiring as well as extracted and/or abstracted shapes with calculated resistances, capacitances, and/or sensitivities. The abstracted circuit design 102 may be based on the output of a Simulation Program with Integrated Circuit Emphasis (SPICE) for one or more variations of the underlying circuit. Alternatively, the abstracted circuit design 102 may otherwise be derived from the described circuit as expressed in a hardware description language (HDL) or may be derived from actual data measured from one or more manufactured prototypes of the circuit to which the abstracted circuit design 102 is directed.

Broadly, and referring still to FIG. 1, the noise analysis program 101 represents the noise cluster 104 according to a variational model 106. In general, the variational model 106 may be understood as any model of a noise cluster 104 that supports variational analysis of maximum and minimum noise given asserted levels of pessimism which are expressed through various assumed and/or nominal values to be passed through the model by projecting the noise cluster 104 onto one or more process corners 108 to yield a projected noise cluster 110. The process corner 108 includes the assumed and/or nominal values that are of interest to the projection. The noise analysis program 101 may apply the projected noise cluster 110 to yield a computed noise 112, which provides a measure of robustness for the circuit described by the abstracted circuit design 102. In some embodiments, the process corner 108 is selected to maximize noise to establish a theoretical upper bound, which can be used to prove the robustness of the circuit described by the abstracted circuit design 102. Optionally, the noise analysis program 101 may add an additional noise margin to the computed noise 112, which allows users to inject additional pessimism into the analysis as appropriate depending on engineering considerations for the particular requirements of a given embodiment.

Figure 2:
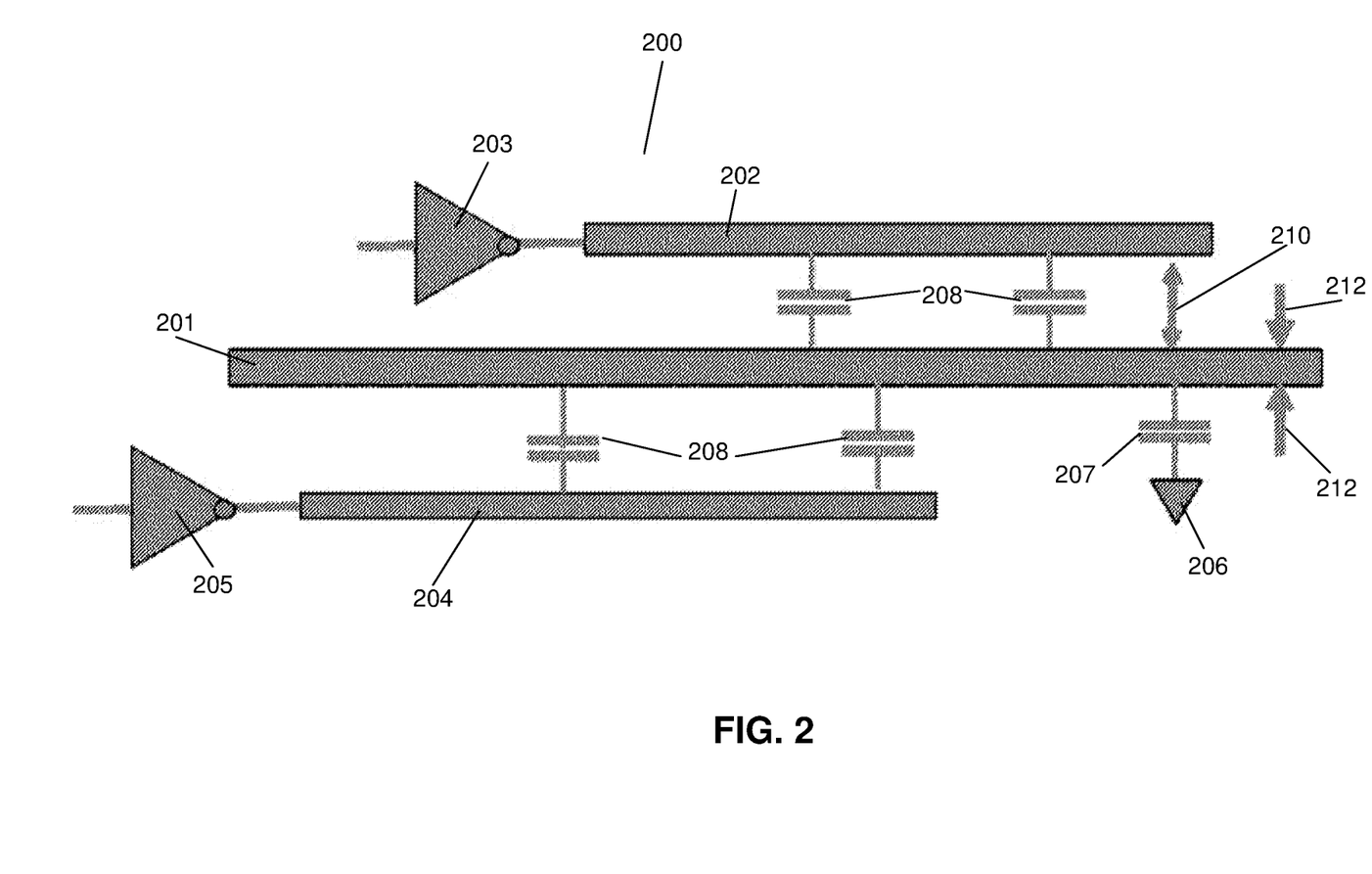
FIG. 2 is a schematic diagram illustrating a noise cluster, in accordance with at least one embodiment of the present invention.

Referring now to FIG. 2, FIG. 2 is a schematic diagram illustrating an exemplary noise cluster 200. In the depicted embodiment, a victim circuit 201 receives coupled noise from a first aggressor circuit 202 and a second aggressor circuit 204 via capacitive couplings 208. As shown, the victim circuit 201 drives a load 206, which is coupled across a load capacitor 207. The first aggressor circuit 202 is a depicted with its driver 203, and the second aggressor circuit 204 is depicted with its driver 205. The capacitive couplings 208 and load capacitor 207 may be understood to represent effective capacitances between circuit elements arising from the circuit structure, rather than capacitors as explicit elements of the circuit design 102. In general, the noise cluster 200 may include any combination of victim and aggressor nets including all or any subset of the nets' various driver cells, interconnects, and load cells. Accordingly, the capacitive couplings 208 may be understood to represent individual effective capacitances at various positions in the noise cluster 200. The capacitance of each capacitive coupling 208 may be understood as based, for some embodiments, on the local distance between wires 210 and wire thickness 212, which may vary according to the process corner 108.

Figure 3:
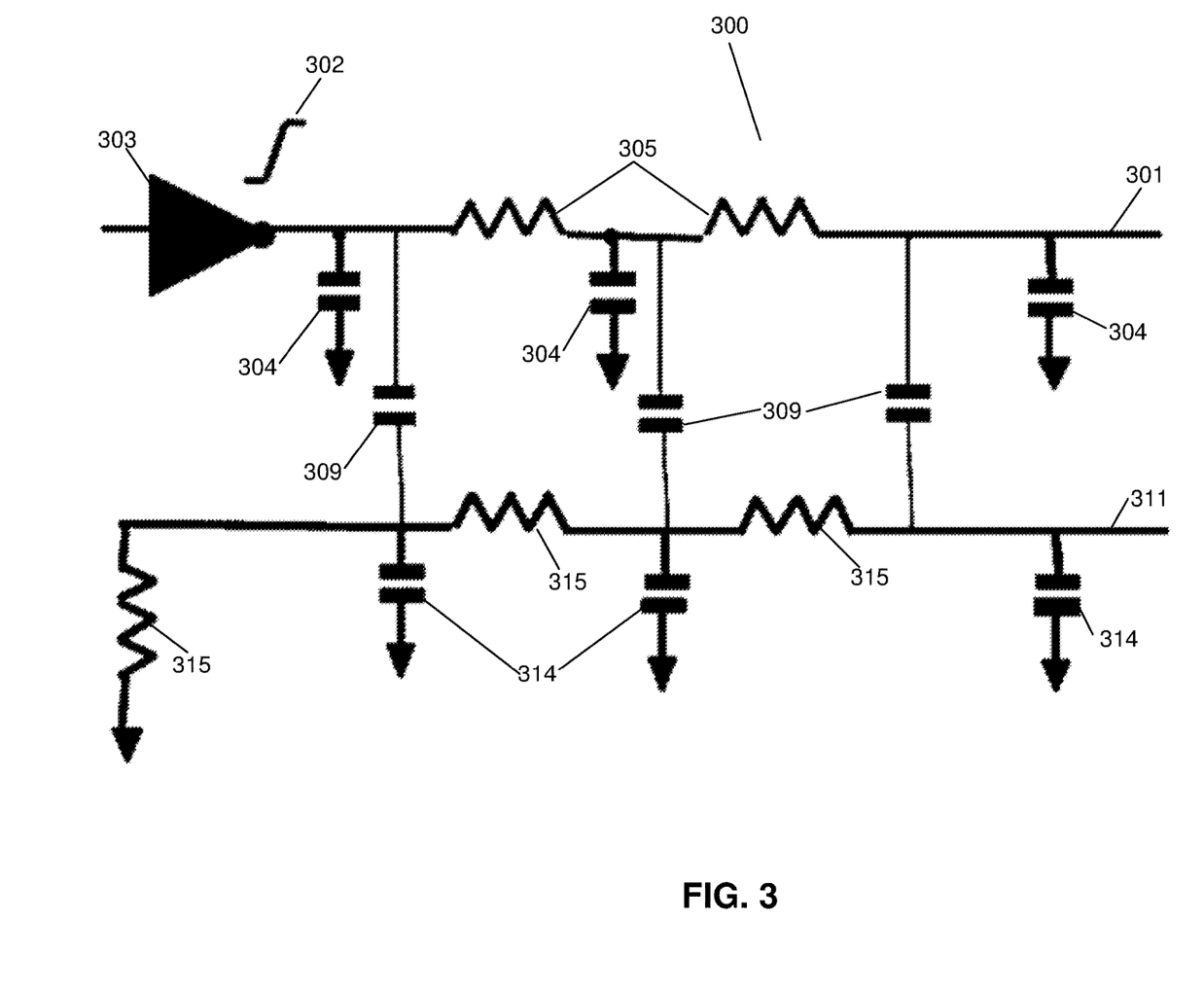
FIG. 3 is a schematic diagram illustrating various analytical elements of a noise cluster, in accordance with at least one embodiment of the present invention.

FIG. 3 depicts various analytical elements for an exemplary noise cluster 300. In the depicted embodiment, an aggressor circuit 301, which carries a digital signal 302 from its driver 303. Aggressor resistors 305 and aggressor capacitors 304 provide an analytical model for the aggressor circuit 301 and its associated interconnects and loads. Similarly, the victim circuit 311 has interconnects and loads modeled by victim resistors 315 and victim capacitors 314. The source of capacitive or crosstalk noise between the victim circuit 311 and the aggressor circuit 301 is modeled by capacitive couplings 309.

Referring still to the schematic diagram of FIG. 3, as represented, the analytical elements for the noise cluster 300 (referred to herein, and in the Claims as "noise cluster element" or, in the Figures, "NCE") may be modeled according a canonical form. Eq. 1 displays a model for a noise cluster element, such as a resistor 315:

$$R = R_0 + r_P \cdot \Delta P + r_V \Delta V + \ldots + r_R \cdot \Delta R \qquad \text{Eq. 1}$$

Eq. 2 displays a model for a capacitive coupling 309:

$$C = C_0 + c_P \cdot \Delta P + c_V \Delta V + \ldots + c_R \cdot \Delta R \qquad \text{Eq. 2}$$

Eq. 1 and Eq. 2 both provide a canonical form for the variational model 106 of the noise cluster 104, which may be represented analytically as the noise cluster 300 of FIG. 3. In Eq. 1, R is the expected resistance of the circuit element expressed as the sum of terms (referred to herein, and in the Claims as "circuit element term", or, in the Figures "CET"). The first term, $R_0$ for resistance (Eq. 1) and $C_0$ for capacitance (Eq. 2) represents the base or nominal value for the noise cluster element. Each circuit element term may relate to one process variables, for example the on-chip variability sources of Process, Voltage, and Temperature ("PVT"), as well as mask misalignment, wire width, wire thickness, via characteristics, and others. Canonical forms for variational models may also be prepared for circuit timing in addition to circuit noise. Where such data exists, the canonical form for timing may be projected in like manner to that disclosed herein such that timing and noise analysis may be conducted together for the same corner with improved analytical value. This leads to a potential advantage in some, but not necessarily all, embodiments of the present invention whereby assumptions about the sensitivity values may be avoided in favor of real data.

Each circuit element term may include a sensitivity value (e.g. $r_P$, $C_P$, $r_V$, $c_V$, etc.) multiplied by a sigma value (e.g. $\Delta P$, $\Delta V$, $\Delta R$, etc.). The sigma values represent standard deviations from nominal, and may be understood as measuring pessimism in the manufacturing process, which relates to a high degree of process variability. The sensitivity values express the degree of change in the computed measure (resistance for Eq. 1, capacitance for Eq. 2) based on the variability, and are expressed in the same units as the first term (e.g. ohms for resistance, farads for capacitance). The sigma value may therefore be understood as scaling the sensitivity with a sigma value of zero meaning nominal such that the term drops out. Additionally, a process corner may be understood mathematically as including substituting one or more sigma values to be paired with corresponding sensitivity values to make up complete circuit element terms of the canonical form.

The variational model 106 may be generated based on at least one of a plurality of corner noise abstracts or a plurality of interconnect parasitics. This data provides a basis for analytically determining the sensitivity values that go into the canonical form. Specifically, the variational model may be generated by any combination of at least one step selected from the group consisting of: (a) finite differencing; (b) asserting values; and (c) analytically computing. For finite differencing, the sensitivities may be computed individually for each noise cluster element using multi-corner extraction or characterization data with accurate variation aware noise computation for sign-off. Finite differencing for an exemplary resistance at the voltage process variable ($r_V$) may be calculated as follows:

$$r_V = \frac{R(V_2) - R(V_1)}{V_2 - V_1} = \frac{\Delta R}{\Delta V}. \qquad \text{Eq. 3}$$

In Eq. 3, $V_1$ and $V_2$ may be understood to represent differing process voltages, with R being the noise cluster element resistance at the given process voltages.

Asserting values for the sensitivities may be done for each type of noise cluster element. For example, each metal layer, each type of device or interconnect, etc., may be understood as having similar parasitic resistance and capacitance elements (including victim holding resistance and pin capacitances), and each may have their own sensitivities. Setting asserted sensitivities may be computationally inexpensive as compared with multicorner extraction, as in finite differencing; this can make it a convenient method for users to explore the variability impact in new technologies for which devices may not already be well-characterized. In asserted sensitivities, sensitivities may be set in terms of fractions of nominal. Asserted sensitivities may be set for an exemplary resistance as follows:

$$R = R_0 + a_P \cdot \Delta P + \ldots + a_R \Delta R \qquad \text{Eq. 4}$$

In Eq. 4, the asserted sensitivities $a_P$ and $a_R$ are inserted into the canonical form. In addition to the finite difference and assertion of values steps, the sensitivity values may be generated by analytically computing the abstracted circuit design using a circuit solver-type simulation. This may be done directly, adjointly, or otherwise.

Various embodiments of the present invention provide a means for preserving generally applicable nondeterministic representations of noise through large segments of the noise analysis process until deterministic values are required to generate a pass/fail conclusion. Thus, canonical forms are transformed into deterministic values by projection:

$$R = R_0 + r_P \cdot \Delta P + r_V \cdot \Delta V + r_T \cdot \Delta T + r_R \cdot \Delta R \rightarrow R_{det} \qquad \text{Eq. 5}$$

To compute $R_{det}$ (also for any $C_{det}$), the noise analysis program 101 identifies a process corner 108, which is expressed as a series of sigma values representing the variability of the particular corner as to each process variable. Various corners may be selected for different degrees of pessimism, depending on the application, the circuit's design requirements, and what values the user is interested in exploring. For various embodiments, each of the one or more corners is selected from the group consisting of: (a) a bounding corner; (b) a non-physical non-bounding corner; (c) a nominal corner; and (d) a realistic corner.

The bounding corner may be understood analytically as the worst-case, maximum noise, scenario. This is achieved by ignoring the physical limitations of actual manufacturing processes, for example by varying the process voltage, the process temperature, the local distance between wires 210, and the wire thickness 212, etc. for adjacent or nearby noise cluster elements. In practice, process variability tends to affect all adjacent or nearby noise cluster elements in the same way (e.g. all at above nominal voltage, below nominal temperature, or all with thin wires, or all with closely spaced wires). Thus, the bounding corner may be understood as a non-physical bounding corner. Generating the bounding corner is described more fully below and in FIG. 5.

In addition to the bounding corner, partially physical and partially non-physical corners provide a means not only to identify individually significant sources of variation, but also to address the shortcoming of physical corners, which is that it may be unpredictable whether a given physical corner, with its constant or near-constant process variables, may tend to increase or decrease overall noise for a given noise cluster or circuit design. Such corners may be termed "non-physical non-bounding corners".

By contrast, a nominal corner is of greatly reduced pessimism wherein all circuit elements are treated the same, with low or zero variability in a given process variable. Even where variability is low, the constant or near-constant that is selected may be off from nominal. In between various nominal corners and the bounding corner are realistic pessimistic corners, which may be constructed to any degree of pessimism that the user may wish to explore while remaining within realistic boundaries of actual variability in the manufacturing process.

Where a corner, expressed as a sigma value, is selected for each circuit element term, the projection may be completed to yield a deterministic resistance or capacitance for the noise cluster element using any of a variety of projection operations:

$$a_P \cdot \Delta P \rightarrow -3 \cdot a_P \qquad \text{Eq. 6}$$

$$a_P \cdot \Delta P \rightarrow \pm 3 \cdot |a_P| \qquad \text{Eq. 7}$$

$$a_X \cdot \Delta X + a_Y \cdot \Delta Y + a_Z \cdot \Delta Z \rightarrow \pm 3\sqrt{a_X^2 + a_Y^2 + a_Z^2} \qquad \text{Eq. 8}$$

Eq. 6 describes projection to a specified corner by simple substitution. In the example, $\Delta P$ is set equal to $-3$ and substituted. Eq. 7 describes projection to the absolute worst corner such that the sigma value is allowed to take $\pm 3$ and the absolute value of the sensitivity is used. Finally, in Eq. 8, projecting the variational model onto one or more corners includes taking a root sum square of two or more of the one or circuit element terms. The root sum square may provide a more broadly based projection as compared with projecting a single value. Finally, varying levels of pessimism may be achieved by combining different projection operations in the same deterministic calculation:

$$R = R_0 + 3 \cdot (|a_T| + |a_V|) + 3\sqrt{a_X^2 + a_R^2} - 2.5 \cdot a_P \qquad \text{Eq. 9}$$

Eq. 9 displays an exemplary mixed projection that includes absolute value projection, a root sum square projection, and a specified corner projection.

Figure 4:
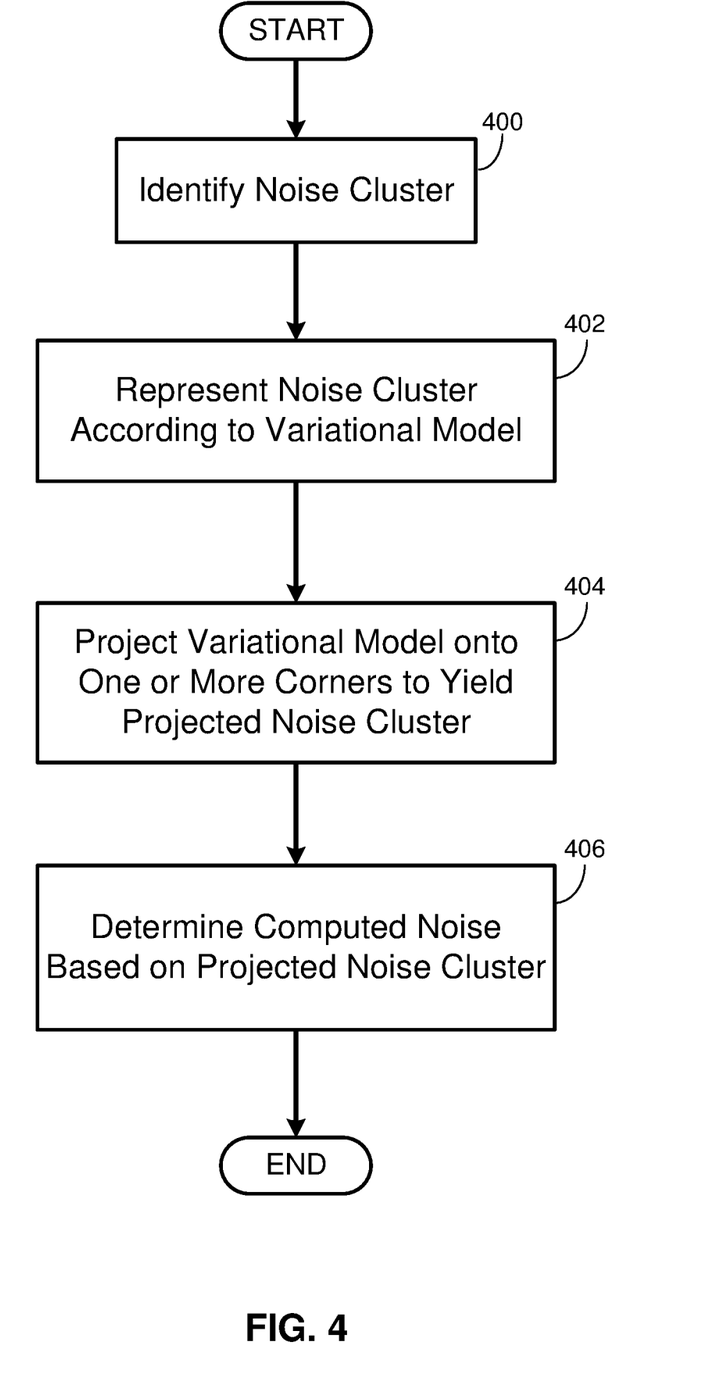
FIG. 4 is a flowchart diagram illustrating various operational steps for a noise analysis program, in accordance with at least one embodiment of the present invention.

FIG. 4 is a flowchart diagram depicting various operational steps for a noise analysis program in accordance with at least one embodiment of the present invention. At step 400, the noise analysis program 101 identifies a noise cluster 104. At step 402, the noise analysis program 101 represents the noise cluster 104 according to the variational model 106. At step 404, the noise analysis program 101 projects the variational model 106 onto one or more corners (e.g. one or more process corners 108) to yield the projected noise cluster 110. At step 406, the noise analysis program determines the computed noise based on the projected noise cluster.

Figure 5:
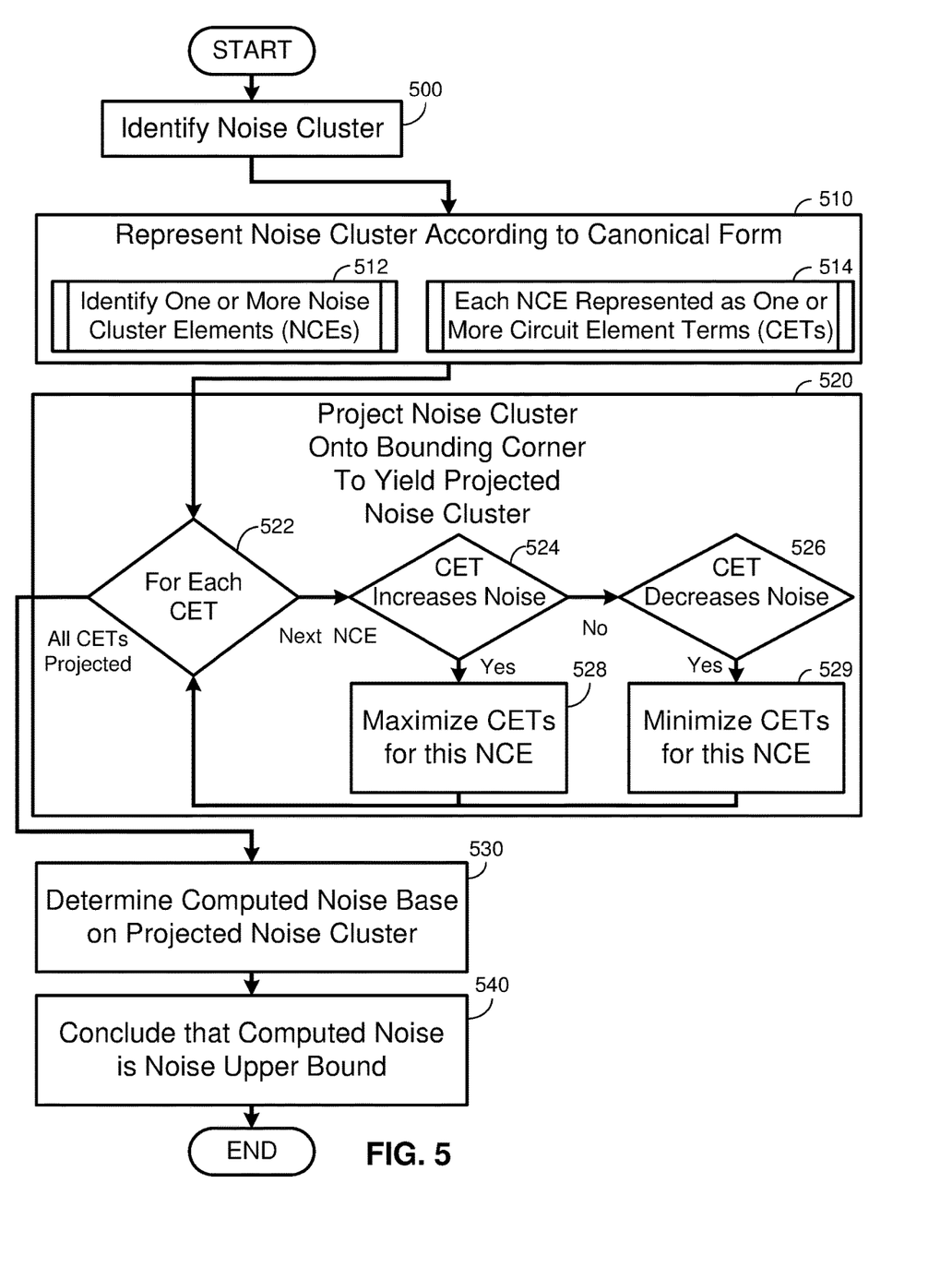
FIG. 5 is a flowchart diagram illustrating various operational steps for generating a bounding corner in the context of a noise analysis program, in accordance with at least one embodiment of the present invention.

Referring now to FIG. 5, FIG. 5 is a flowchart diagram illustrating various operational steps for generating a bounding corner in the context of a noise analysis program, in accordance with at least one embodiment of the present invention. At step 500, similar to step 400, the noise analysis program 101 identifies a noise cluster 104. The noise cluster 104, in the depicted embodiment, is understood to include one or more noise cluster elements (identified at step 512). At step 510, analogous to step 402, the noise analysis program 101 represents the noise cluster 104 according to a variational model 106. Representing the noise cluster 104 according to a variational model includes expressing each of the one or more noise cluster elements as one or more circuit element terms (step 514), according to a canonical form, as shown.

Referring still to FIG. 5, in the depicted embodiment, at least one of the process corners 108 for analysis includes the bounding corner. At step 520, the noise analysis program 101 projects the noise cluster 104 onto the bounding corner. The bounding corner may be generated by, for each noise cluster element (decision block 522), determining whether the noise cluster element tends to increase or decrease noise in the nose cluster 104. Responsive to the noise cluster element tending to increase noise (decision block 524), maximizing the one or more circuit element terms for the noise cluster element (step 528). Responsive to the noise cluster element tending to decrease noise (decision block 526), minimizing the one or more circuit element terms for the noise cluster element (step 529). In an alternative embodiment, a best-case low noise bounding corner may also be generated. This may be achieved by a similar process to that depicted in FIG. 5, but by reversing which circuit element terms are minimized and maximized so as to decrease overall noise.

As described in Eq. 1 and Eq. 2, each of the one or more circuit element terms may include a sensitivity value multiplied by a sigma value. In the context of determining a bounding corner, "maximizing" and "minimizing" of circuit element terms means increasing or decreasing, respectively, the sigma value of each term out to a predetermined maximum or minimum level of pessimism, expressed in terms of a sigma value above or below nominal. The noise analysis program 101 may perform the steps of identifying a predetermined maximum sigma value and identifying a predetermined minimum sigma value. Maximizing the one or more circuit element terms for the noise cluster element may include increasing the sigma value for the noise cluster element to the maximum sigma value, and minimizing the one or more circuit element terms for the noise cluster element may include decreasing the sigma value for the noise cluster element to the minimum sigma value.

For example, users may determine that $3\sigma$ or $4\sigma$ is sufficiently pessimistic for purposes of determining a noise upper bound for circuit analysis. The degree to which each value is "maximized" or "minimized" may vary based on the specific embodiment and engineering considerations, such that the invention is expressly understood to encompass "maximizing" or "minimizing" to a lesser degree than possible in theory, but rather out to a variable extreme notion of variation that is understood, in the particular embodiment, to be sufficient for meaningfully establishing the most noise possible for a valuable non-physical bounding corner.

Referring still to FIG. 5, at step 530 (analogous to step 406), the noise analysis program 101 determines the computed noise 112 based on the projected noise cluster 110, which is, partly or wholly, for the bounding corner. Because a theoretical, worse-than-realistic level of noise has been created through the bounding corner, the noise analysis program 101 may conclude, at step 540, that noise is maximized for the canonical form. Further, in embodiments where the one or more process corners 108 include only the bounding corner, the computed noise 112 includes a noise upper bound by virtue of the worse-than-realistic assumptions of the bounding corner.

Figure 6:
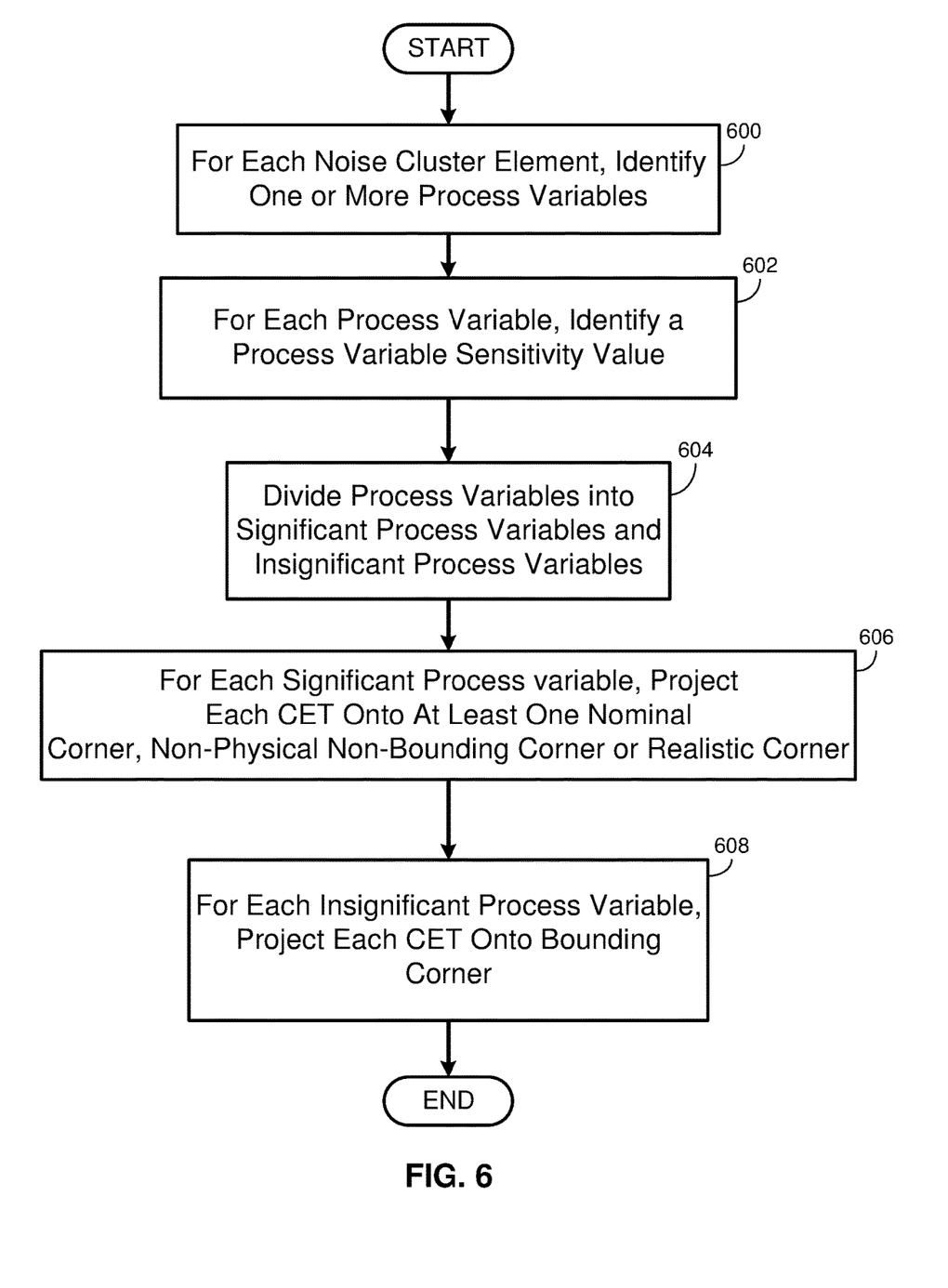
FIG. 6 is a flowchart diagram illustrating various operational steps for processing multiple corners in the context of a noise analysis program, in accordance with at least one embodiment of the present invention.

FIG. 6 is a flowchart diagram illustrating various operational steps for processing multiple corners by the noise analysis program 101. At step 600, the noise analysis program identifies, for each noise cluster element one or more process variables. Examples of process variables include PVT: Process, Voltage, and Temperature. In the context of PVT, Process may include the distance between wires 210 and wire thickness 212. Additional process variables may include relative speed of N-channel and P-channel devices (NFETs and PFETs, respectively, for MOSFET devices) in the manufactured circuit. Thus, each of the one or more process variables is associated with at least one of the one or more corners to be analyzed, which may include any combination of bounding corners, nominal corners, or realistic pessimistic corners.

At step 602, for each of the one or more process variables, the noise analysis program 101 identifies a process variable sensitivity value. Where a canonical form is used, as in Eq. 1 and Eq. 2, the process variable sensitivity value (e.g. $r_P$) may be the sensitivity factor of the circuit element term for the particular process variable and noise cluster element in combination. At step 604, the noise analysis program 101 divides the one or more process variables into a plurality of significant process variables and a plurality of insignificant process variables, based on the process variable sensitivity value. Specifically, high sensitivity process variables will affect noise much more for a given change in the underlying variable than will insignificant process variables. In various embodiments, more than two groupings or gradations of sensitivity may be applied, and the boundary between the groupings may vary depending on engineering considerations and the degree of pessimism sought by the user.

Based on the distinction between significant and insignificant process variables, projecting the variational model onto the one or more corners (analogous to step 404) may include, at step 606, for each of the plurality of significant process variables, projecting each of the one or more circuit element terms onto at least one of a nominal corner, a non-physical non-bounding corner, or a realistic corner, and, at step 608, for each insignificant process variable, projecting each of the one or more circuit element terms onto the bounding corner. Since many corners will thus include overlapping computed values for those circuit element terms projected to the bounding corner, it is possible to obtain additional computational efficiency by projecting once to the bounding corner on all of the insignificant process variables, and then changing only the additional corners during iterative processing. Thus, by selecting the bounding corner for the insignificant process variables, those process variables are analyzed as worst-case, and can be discounted as sources of unacceptable noise, if the computed noise 112 for the noise cluster 104 or overall circuit remains at acceptable levels. An additional potential benefit for those embodiments that restrict insignificant process variables to being projected to a single bounding corner is that it reduces the number of unique corners that must be enumerated in order to cover the variational space. By contrast, by selecting nominal or realistic pessimistic corners for the significant process variables, users can explore and fine-tune varying levels of pessimism in those circuit elements that matter the most for noise.

In embodiments configured for further multi-corner analysis, the noise analysis program 101 may identify a noise threshold and determine whether the computed noise 112 exceeds the noise threshold. Responsive to the computed noise 112 exceeding the noise threshold, the noise analysis program 101 may return a noise violation. The noise threshold may be modeled as a noise rejection curve. Where a noise pulse is modeled as a plot of voltage against time, it is possible to analyze the peak and width of noise pulses and, then plot a curve of maximally acceptable noise peak versus noise width such that a tall (relatively high voltage) pulse might be acceptable noise if it is sufficiently narrow (short in duration), or a wide (long in duration) pulse may be acceptable noise if it is short (relatively low voltage). Exact quantities for acceptable and unacceptable noise are dependent upon the circuit design requirements and engineering considerations. More generally, noise thresholds, whether modeled as a noise rejection curve or otherwise, may be understood as one set of criteria among many for the circuit's passing or failing noise analysis of the present invention. Additionally, the noise rejection curve may be applied to enrich the circuit model (e.g. FIG. 2) by replacing the load 206 or other sink; thus a deterministic pass/fail output may be applied to the variational model for various embodiments of the present invention. Further, by modeling the load 206 in accordance with the canonical forms of the present invention, the noise rejection curve may be projected to any desired corner, thus generating deterministic failure criteria for the corner.

Thus, the multi-corner analysis may be repeated over many corners 108 and combinations of corners 108, as well as over many noise clusters 104. Using a noise violation as output, the noise analysis program 101 may be used to identify noise sources at all levels throughout the analysis. Thus, projecting the variational model onto the one or more corners (step 404) may further include iteratively processing a next corner of the one or more corners. In such a process, the next corner is of the at least one of the nominal corner, the non-physical non-bounding corner, or the realistic corner. Thus, in various embodiments, the bounding corner is processed first, followed by all other corners. In various embodiments, the bounding corner may be immediately followed by a nominal corner, and then all other corners. Alternatively, the order of processing the other corners chosen may be in order of decreasing pessimism. Alternatively, the order of processing the other corners may be tailored by the user to provide the most filtering and/or learning offered to the user. Under various multi-corner analysis approaches, the noise analysis program 101 may be understood as beginning with a worst case scenario (the bounding corner or most pessimistic non-bounding corner) and proceeding to adjust noise-causing variability until a performing circuit or an informatively non-performing circuit is found. This provides the user with detailed diagnostic information about the noise tolerance of the manufacturing process for the circuit design 102.

In a variation on the multi-corner analysis, the noise analysis program 101 may speed up the projection of any given corner. Specifically, projecting the variational model onto one or more corners may be understood to include projecting the variational model onto a fast corner. The fast corner includes one or more initial sigma values. The initial sigma values are simply those sigma values included in the particular corner to be sped up by creating the fast corner. To generate a fast corner, the noise analysis program 101 divides the one or more noise cluster elements into a plurality of significant noise cluster elements and a plurality of insignificant noise cluster terms, based on a nominal value for each noise cluster element. The nominal value for a given noise cluster element may be understood, in some embodiments, as the single sigma value that would be applied to all circuit element terms for the noise cluster in a nominal corner. Those noise cluster elements that have a small nominal value relative to other noise cluster elements may be identified as insignificant, and those noise cluster elements that have a large nominal value relative to other noise cluster elements may be identified as significant. The cutoff between significant and insignificant may be determined by the user according to design-specific or project-specific considerations. For each of the plurality of insignificant noise cluster elements, the noise analysis program 101 may set at least one corresponding sigma value of the one or more initial sigma values to a bounding sigma value. The bounding sigma value may be understood as the worst-case value that would be applied for the bounding corner, as described above. For each of the plurality of significant noise cluster elements, the noise analysis program 101 leaves at least one corresponding sigma value of the one or more initial sigma values unchanged. The resulting fast corner is faster to process than it would otherwise be because it is not necessary to calculate and/or re-project individual sigma values for all circuit element terms, especially if the sigma values and/or projections for the bounding corner have already been determined such that they may be re-used.

Figure 7:
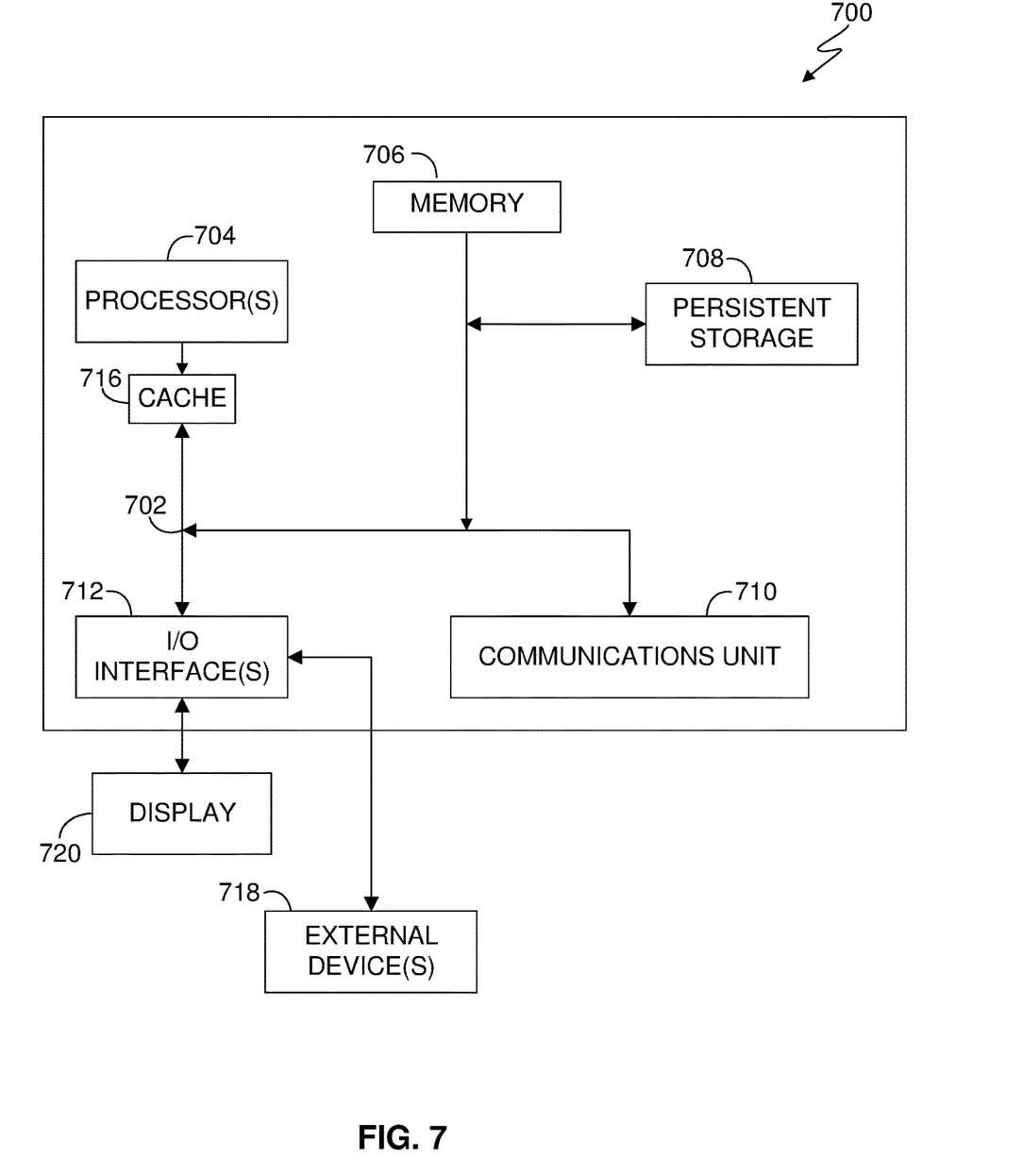
FIG. 7 is a block diagram displaying various components of a computing apparatus suitable for executing the noise analysis program, in accordance with at least one embodiment of the present invention.

FIG. 7 is a block diagram depicting components of a computer 700 suitable for executing the noise analysis program 101. FIG. 7 displays the computer 700, the one or more processor(s) 704 (including one or more computer processors), the communications fabric 702, the memory 706, the RAM, the cache 716, the persistent storage 708, the communications unit 710, the I/O interfaces 712, the display 720, and the external devices 718. It should be appreciated that FIG. 7 provides only an illustration of one embodiment and does not imply any limitations with regard to the environments in which different embodiments may be implemented. Many modifications to the depicted environment may be made.

As depicted, the computer 700 operates over a communications fabric 702, which provides communications between the cache 716, the computer processor(s) 704, the memory 706, the persistent storage 708, the communications unit 710, and the input/output (I/O) interface(s) 712. The communications fabric 702 may be implemented with any architecture suitable for passing data and/or control information between the processors 704 (e.g. microprocessors, communications processors, and network processors, etc.), the memory 706, the external devices 718, and any other hardware components within a system. For example, the communications fabric 702 may be implemented with one or more buses or a crossbar switch.

The memory 706 and persistent storage 708 are computer readable storage media. In the depicted embodiment, the memory 706 includes a random access memory (RAM). In general, the memory 706 may include any suitable volatile or non-volatile implementations of one or more computer readable storage media. The cache 716 is a fast memory that enhances the performance of computer processor(s) 704 by holding recently accessed data, and data near accessed data, from memory 706.

Program instructions for the noise analysis program 101 may be stored in the persistent storage 708 or in memory 706, or more generally, any computer readable storage media, for execution by one or more of the respective computer processors 704 via the cache 716. The persistent storage 708 may include a magnetic hard disk drive. Alternatively, or in addition to a magnetic hard disk drive, the persistent storage 708 may include, a solid state hard disk drive, a semiconductor storage device, read-only memory (ROM), electronically erasable programmable read-only memory (EEPROM), flash memory, or any other computer readable storage media that is capable of storing program instructions or digital information.

The media used by the persistent storage 708 may also be removable. For example, a removable hard drive may be used for persistent storage 708. Other examples include optical and magnetic disks, thumb drives, and smart cards that are inserted into a drive for transfer onto another computer readable storage medium that is also part of the persistent storage 708.

The communications unit 710, in these examples, provides for communications with other data processing systems or devices. In these examples, the communications unit 710 may include one or more network interface cards. The communications unit 710 may provide communications through the use of either or both physical and wireless communications links. The noise analysis program 101 may be downloaded to the persistent storage 708 through the communications unit 710. In the context of some embodiments of the present invention, the source of the various input data may be physically remote to the computer 700 such that the input data may be received and the output similarly transmitted via the communications unit 710.

The I/O interface(s) 712 allows for input and output of data with other devices that may operate in conjunction with the computer 700. For example, the I/O interface 712 may provide a connection to the external devices 718, which may include a keyboard, keypad, a touch screen, and/or some other suitable input devices. External devices 718 may also include portable computer readable storage media, for example, thumb drives, portable optical or magnetic disks, and memory cards. Software and data used to practice embodiments of the present invention may be stored on such portable computer readable storage media and may be loaded onto the persistent storage 708 via the I/O interface(s) 712. The I/O interface(s) 712 may similarly connect to a display 720. The display 720 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A system comprising:
an abstracted circuit design;
a noise cluster;
a noise analysis program configured to
identify the noise cluster;
represent the noise cluster according to a variational model wherein the variational model supports variational analysis of a maximum and a minimum noise given asserted levels of pessimism, the maximum and the minimum noise are expressed through assumed and/or nominal values that are passed through the variational model to represent the noise cluster;
project the variational model onto one or more corners to yield a projected noise cluster; and
determine a computed noise for the projected noise cluster.

2. The system of claim 1, wherein the variational model is generated, based on at least one of a plurality of corner noise abstracts or a plurality of interconnect parasitics, by any combination of at least one step selected from the group consisting of:
(a) finite differencing;
(b) asserting values; and
(c) analytically computing.

3. The system of claim 1, wherein:
the noise cluster comprises one or more noise cluster elements; and
representing the noise cluster according to a variational model comprises expressing each of the one or more noise cluster elements as one or more circuit element terms, according to a canonical form.

4. The system of claim 3, wherein each of the one or more circuit element terms comprises a sensitivity value multiplied by a sigma value.

5. The system of claim 3, wherein projecting the variational model onto one or more corners comprises taking a root sum square of two or more of the one or more circuit element terms.

6. The system of claim 3, further comprising adding an additional noise margin to the computed noise.

7. The system of claim 3 wherein the noise analysis program is further configured to:
project the variational model onto one or more corners by projecting the variational model onto a fast corner;
wherein the fast corner comprises one or more initial sigma values.

8. The system of claim 7 wherein the noise analysis program is further configured to:
transform the one or more initial sigma values by:
dividing the one or noise cluster elements into a plurality of significant noise cluster elements and a plurality of insignificant noise cluster elements, based on a nominal value for each noise cluster element;
for each of the plurality of insignificant noise cluster elements, setting at least one corresponding sigma value of the one or more initial sigma values to a bounding sigma value; and
for each of the plurality of significant noise cluster elements, leaving at least one corresponding sigma value of the one or more initial sigma values unchanged.

9. The system of claim 3, wherein each of the one or more corners is selected from the group consisting of:
(a) a bounding corner;
(b) a non-physical non-bounding corner;
(c) a nominal corner; and
(d) a realistic corner.

10. The system of claim 9, wherein:
at least one of the one or more corners comprises the bounding corner; and
the bounding corner is generated by, for each noise cluster element:
responsive to the noise cluster element tending to increase noise, maximizing the one or more circuit element terms for the noise cluster element; and
responsive to the noise cluster element tending to decrease noise, minimizing the one or more circuit element terms for the noise cluster element;
whereby noise is maximized for the canonical form for the bounding corner.

11. The system of claim 10, wherein:
the one or more corners comprises only the bounding corner; and
the computed noise comprises a noise upper bound.

12. The system of claim 10, wherein the noise analysis program is further configured to:
identify a predetermined maximum sigma value;
identify a predetermined minimum sigma value;
maximize the one or more circuit element terms for the noise cluster element by increasing the sigma value for the noise cluster element to the maximum sigma value; and
minimize the one or more circuit element terms for the noise cluster element by decreasing the sigma value for the noise cluster element to the minimum sigma value; and
wherein each of the one or more circuit element terms comprises a sensitivity value multiplied by a sigma value.

13. The system of claim 9, wherein the noise analysis program is further configured to:
for each the noise cluster element, identify one or more process variables, each of the one or more process variables being associated with at least one of the one or more corners; and
for each of the one or more process variables, identify a process variable sensitivity value; and
dividing the one or more process variables into a plurality of significant process variables and a plurality of insignificant process variables, based on the process variable sensitivity value.

14. The system of claim 13 wherein the noise analysis program is further configured to:
project the variational model onto one or more corners by:
for each of the plurality of significant process variables, projecting each of the one or more circuit element terms onto at least one of the nominal corner, the non-physical non-bounding corner, or the realistic corner; and
for each of the plurality of insignificant process variables, projecting each of the one or more circuit element terms onto the bounding corner.

15. The system of claim 14 wherein the noise analysis program is further configured to:
identify a noise threshold;
determine whether the computed noise exceeds the noise threshold; and
return a noise violation, in response to the computed noise exceeding the noise threshold.

16. The system of claim 15 wherein the noise analysis program is further configured to:
project the variational model onto one or more corners by iteratively processing a next corner of the one or more corners; and
wherein the next corner is of the at least one of the nominal corner, the non-physical non-bounding corner, or the realistic corner.

17. A computer program product, the computer program product comprising one or more computer readable storage media and program instructions stored on the one or more computer readable storage media, the program instructions comprising instructions to:
identify a noise cluster;
represent the noise cluster according to a variational model wherein the variational model supports variational analysis of a maximum and a minimum noise given asserted levels of pessimism, the maximum and the minimum noise are expressed through assumed and/or nominal values that are passed through the variational model to represent the noise cluster;

project the variational model onto one or more corners to yield a projected noise cluster; and determine a computed noise for the projected noise cluster.

18. The computer program product of claim 17, wherein:

the noise cluster comprises one or more noise cluster elements; and the instructions to represent the noise cluster according to a variational model comprise instructions to express each of the one or more noise cluster elements as one or more circuit element terms, according to a canonical form.

19. The computer program product of claim 18, wherein:

at least one of the one or more corners comprises a bounding corner; and the bounding corner is generated by, for each noise cluster element:

responsive to the noise cluster element tending to increase noise, maximizing the one or more circuit element terms for the noise cluster element; and responsive to the noise cluster element tending to decrease noise, minimizing the one or more circuit element terms for the noise cluster element;

whereby noise is maximized for the canonical form for the bounding corner.

* * * * *